July 29, 1969   C. MARCHETTI   3,458,160
ROTATING-WING AIRCRAFT
Filed March 24, 1966   2 Sheets-Sheet 1

Inventor
Charles Marchetti
Pennie, Edmonds, Morton, Taylor & Adams
Attorneys

July 29, 1969

C. MARCHETTI 3,458,160

ROTATING-WING AIRCRAFT

Filed March 24, 1966

3,458,160
ROTATING-WING AIRCRAFT
Charles Marchetti, Paris, France, assignor to Societe Charles Marchetti, Paris, France, a company of France
Filed Mar. 24, 1966, Ser. No. 537,066
Claims priority, application France, Mar. 26, 1965, 10,846
Int. Cl. B64c 27/22; B63h 7/02
U.S. Cl. 244—6　　　　　　　　　　　　　　6 Claims

ABSTRACT OF THE DISCLOSURE

In contrast to a conventional composite helicopter having the same aboard power, weight, surface and profile of fixed wing, etc. the disclosed rotating-wing aircraft is provided with a rotor having a smaller diameter and/or a reduced blade profile, while the moment of inertia, the rigidity and the strength of the blades is each increased, whereby the aircraft can take-off substantially vertically by means of an overspeed of the rotor and can fly at higher forward speeds, due to a reduction of the drag, but cannot carry out hovering or lateral flights.

---

The present invention relates to a rotating-wing aircraft which is capable at the same time of taking-off vertically or within a short distance and of having high speeds of forward movement. In more precise terms, the aircraft according to the invention is related to combined helicopters.

It is known that composite helicopters are gyroplanes which comprise a rotor, propulsion means and a fixed lifting wing. The rotor is designed in such manner that the machine can behave like a helicopter, that is to say it can take-off and land vertically and can carry out hovering flight or flight rearwards and sideways.

The machine according to the invention is essentially distinguished from these known composite helicopters by the design of the rotor which enables, under conditions which are moreover identical (installed power, weight, surface and profile of fixed wing, surface area of the rotor blades, ambient conditions, etc.) the apparatus to fly at substantially higher forward speeds in horizontal flight.

The invention has therefore for its object an aircraft provided with a driven rotor, propulsion means and a fixed wing, characterized in that the rotor is designed so as to permit the apparatus to take-off without providing the machine with the ability of carrying out stationary or lateral flights.

By abandoning the possibility of stationary or lateral flight, it is possible to design and construct a rotor having a diameter smaller and/or a blade profile reduced with respect to what would be necessary for a conventional rotor capable precisely of effecting stationary and lateral flight.

In addition, the moment of inertia of the blades is increased by arranging them so that the major portion of the weight of each blade is concentrated in the outer half of the length of the said blade, contrary to the conventional practice in which it is arranged that the centre of gravity of each blade is in the inner half of the length of the said blade. Finally, the blades are given a rigidity and a strength such that the rotor can withstand an overspeed of at least 15% during taking-off. Thus, with a reduced diameter of the rotor and/or a reduced cross-sectional area of the blades, in combination with the increase of the moment of inertia of each blade and of their rigidity and their strength, stationary or lateral flights are of course not possible, but the take-off can be effected practically without forward movement on the ground by utilizing the kinetic energy accumulated in the rotor during its run-up to speed, in addition to the other sources of energy (power supplied to the rotor and power supplied by the propulsion means) to cause the machine to take-off and accelerate until the installed power exceeds the power necessary for the corresponding state of flight.

The rotor drive will preferably be effected by reaction, either by jet nozzles at the extremities of the blades or by suitably-disposed arms.

The reduction of the section of passage for the gases necessary for driving the rotor by reaction permits of a reduction of the chord and/or the thickness of the blades, or a reduction of the rotor hub. In all cases, the total drag is reduced, so that the speed of the machine can be increased in forward horizontal flight.

The aircraft according to the invention thus has the simplicity of the autogyro while having however the possibility in flight of maintaining power on the rotor. It also possesses the essential quality of the helicopter, mainly the possibility of taking-off vertically. In addition, the two main advantages of the jet helicopter, namely the elimination of the tail-rotor and the great inertia of the blades which guarantee safety, are retained. However, in order to obtain the great simplicity which is one of the advantageous properties of the aircraft according to the invention, the less frequently used types of flight such as prolonged hovering flight and rearwards and sideways flights have been abandoned.

In the majority of cases, the means ensuring the propulsion of the machine will be conventional means (turboprop, jet reactor, etc.) carried on the aircraft. However, these means may not be carried by the aircraft itself, but for example by another aircraft which tows it.

The fluid ensuring the rotation of the reaction rotor will preferably be supplied by the same means as those providing the propulsion of the aircraft. For example, if the propulsion is effected by a double flux reactor, a part of the secondary air can be tapped-off for running the rotor up to speed. The primary thrust, which would be troublesome in the case of a helicopter capable of making stationary flight, is in this case immediately used to permit the machine to reach its autonomous speed very rapidly, at which no further kinetic energy can be taken from the rotor.

Instead of utilizing one or more double-flux reactors, the same result can be obtained by utilizing turbo-props or piston engines driving a compressor which is capable of supplying the compressed-air necessary for running the rotor up to speed.

As has been indicated above, the rotor is driven by means of a source of low power, so that the kinetic energy of the blades serves especially to ensure the take-off of the machine. More particularly, the power available for taking-off is made-up of three parts:

(1) The power supplied to the rotor directly, preferably by reaction of the discharge nozzles at the extremities of the blades;

(2) The power supplied by the propulsion means (airscrew, reactor, etc.);

(3) The kinetic energy accumulated during the running-up to speed of the rotor.

With this characteristic according to the invention, there is obtained an aircraft which is capable of flying at a stationary condition of the rotor above a certain minimum speed of translation.

On the other hand, the take-off phase is effected by means of a transient condition, in which the speed of the rotor diminishes from its maximum over-speed value to its normal speed.

It is of course possible to combine with the machine according to the invention, technical means already under study or produced, and which generally lead to the deflection of hot or cold jets towards the ground by means of air screws, faired or not, of reaction jets, deflected or not, of ejectors, air cushions, wings with blowing or suction arrangements, etc.

From another aspect, the invention relates to machines with vertical take-off or with a short take-off, actually known, to which there is added a rotor designed in accordance with the invention in order to improve the take-off possibilities of these machines and to derive additional advantages from these machines.

The description which follows below with reference to the accompanying drawings and which is especially given by way of example, will make it quite clear how the invention may be carried into effect.

Figure 1:
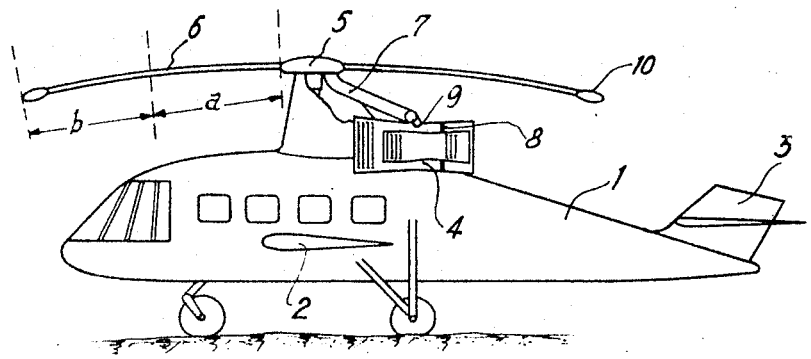
FIG. 1 is a diagrammatic view in side elevation of an aircraft according to the invention.

In FIG. 1 there has been shown a machine which comprises a fuselage 1 carrying a fixed wing system 2 and rudder controls 3. In addition, propulsion means have been indicated in the form of a turbo-fan jet engine 4.

A rotor 5, freely rotatable, is mounted on this machine. The blades 6 of this rotor are hollow so as to permit of its rotational drive by reaction. This drive is effected by the secondary air derived from the secondary flux of the reactor 4 by a conduit 7. A member 8 enables the passage of the secondary flux to its normal point of issue to be partly closed, while another member 9 controls the flow of air sent through the conduit 7 to the hollow hub 5 of the rotor, from which the air passes through the hollow blades 6 and reaches the end discharge nozzles 10, or, when so required, passes to arms provided for that purpose.

Figure 2:
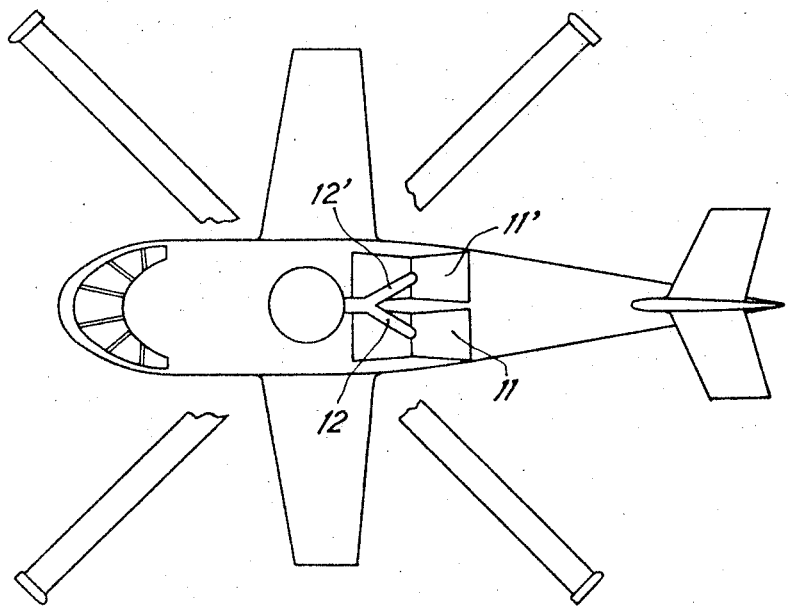
FIG. 2 is a view from above with parts broken away, of the same machine in one alternative form of construction.

Another construction to which the present invention can be applied is given in FIG. 2, which shows a number of double-flux reactors, for example two reactors 11 and 11', on the secondary fluxes of which the air is extracted at 12 and 12' for running the rotor up to speed.

Figure 3:
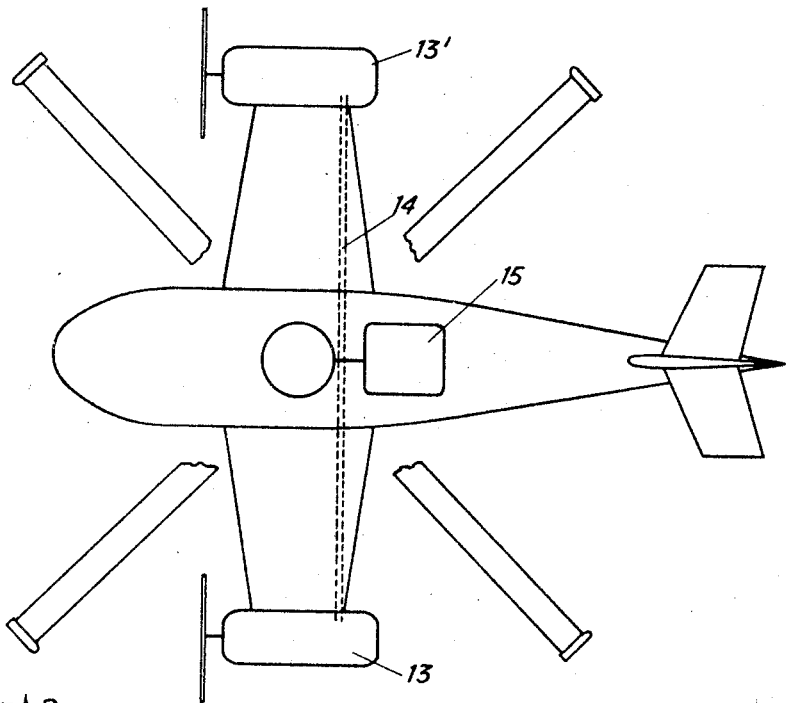
FIG. 3 shows a plan view of a third form of embodiment of the invention.

In accordance with the alternative form shown in FIG. 3, instead of the double-flux reactors, there are employed turbo-propulsion units 13 and 13' or piston engines acting through a suitable coupling 14 to drive a compressor 15 capable of supplying compressed air for running the rotor up to speed.

The arrangement of the power source or sources can be the same as that which is already provided on autogyros, helicopters or aircraft, namely, according to the formula of the machine, on any desired part of the fuselage or alternatively on the wings or on the additional devices which are fixed to the fuselage or on the wings.

In all cases, the rotor designed in accordance with the invention enables the aircraft to take-off practically without running on the ground, while the conventional manoeuvres of a helicopter, such as hovering flight or lateral flight are not possible. To this end, the diameter of the rotor and/or the section of the blades is reduced to the maximum extent with respect to that which would be necessary if the rotor were conventionally designed to ensure hovering or lateral flights.

For example, to give an idea by comparison with a conventional composite helicopter, and under the same conditions, namely of installed power, weight, surface area and profile of the fixed wings, surface area of the blade, ambient conditions and when applicable, the pressure of the compressor, etc., the diameter of the rotor will be reduced by at least 25% or alternatively the section of passage of the gases may be reduced by at least 40%. The reduction of the diameter of the rotor and of the section of passage of the gases in the blades may of course be combined.

In addition, in each of the blades, the moment of inertia is increased by disposing the major portion of the weight in the outer half of the length of the said blade, instead of concentrating this weight in the inner half of the length, that is to say the half nearest to the hub. This is illustrated in FIG. 1, in which one of the blades 6 is indicated as being divided into inner and outer parts $a$ and $b$ of equal length, but with the major portion of the weight of the blade 6 located in the outer half $b$. Finally, the blades are given sufficient rigidity and strength for the rotor to be able to withstand an overspeed during starting-up, which may be at least 15% higher than the normal speed.

Figure 4:
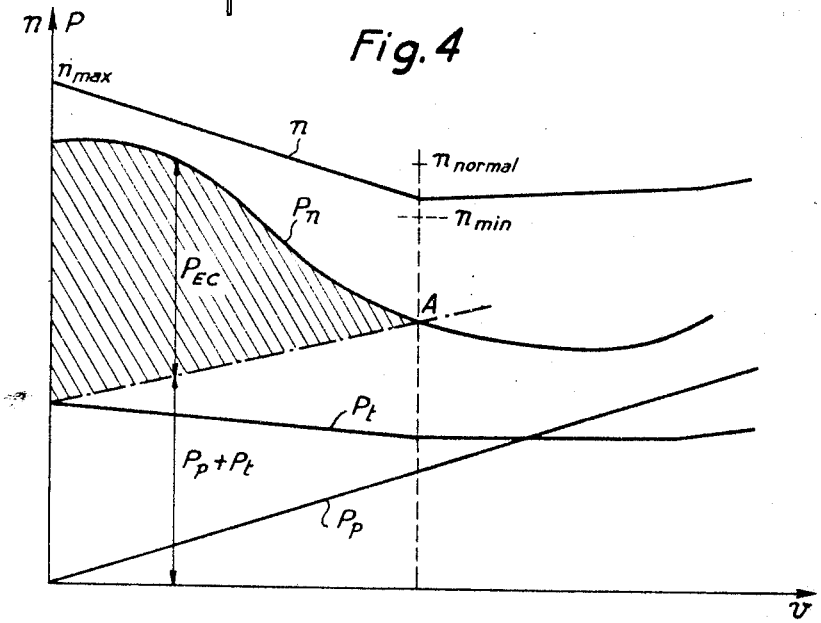
FIG. 4 is a diagram showing the variations of the various power outputs and of the conditions as a function of the forward speed during the take-off of a machine according to the invention.

In the diagram of FIG. 4, there has been shown the curve of variation of the required power $P_n$ as a function of the forward speed during taking-off. Before the actual take-off, the rotor is run-up to speed on the ground until it reaches a speed indicated on the curve by $n_{max}$ which corresponds to an over-speed of at least 15% with respect to the normal speed.

The power supplied by the propulsion unit or units increases as indicated at $P_p$ in the drawing, while the power produced by the discharge nozzles of the rotor is shown by the substantially straight-line portion $P_t$. The addition of these two sets of power values gives the substantially straight-line curve drawn in chain-dotted line. The additional power required in order to attain the power necessary is supplied by the kinetic energy of the rotor at over-speed. This additional power is indicated at $P_{EC}$.

While the speed of the rotor falls until it reaches a value in the vicinity of its normal speed, which is accompanied by a reduction of the power delivered by the kinetic energy $P_{EC}$, the additional power produced $P_t$ by the rotor discharge nozzles increases until it exceeds the power required at the point A, which is the point of equilibrium at which the power available is equal to the power required. It can therefore be seen that the take-off phase is effected by means of a transient condition in which the speed of the rotor falls from its maximum over-speed value to its normal speed. During the course of this phase, the energy available is composed of three parts:

(1) The energy supplied to the rotor by reaction of the discharge nozzles at the extremities of the blades;

(2) The energy supplied by the propulsion means;

(3) The kinetic energy accumulated during the running-up to speed of the rotor, before taking-off.

Thus, the aircraft is capable of taking-off practically without running on the ground, and then of flying at a stationary condition of the rotor above a certain minimum speed of translation.

In starting the plane for take-off the rotor is run up to speed to a flat pitch and the speed increased to about 15 percent over normal. After the 15 percent increased rotor speed is obtained, the primary propulsion unit for forward flight is operated for a take-off. The pitch of the blades is increased to give the plane its part of the lift. The provision of the shorter blades and the increased mass in their outer half serves to keep the rotor from slowing down.

With an aircraft of this kind, whereas it is certainly not possible to carry out the hovering or lateral flights peculiar to the helicopter, on the other hand it is possible to reduce substantially the diameter of the rotor and/or the section of passage for the gases in the said rotor blades. This latter feature is especially advantageous, since a reduction of the section of passage makes it possible in consequence to reduce either the chord or the thickness, or both, of each blade and also to reduce the rotor hub.

Finally, the total drag of the rotor will be considerably reduced, so that the speed of the machine can be increased. For example, under identical conditions and in particular for the same installed power and the same weight, of the order of ten tons for example, a conventional composite helicopter will have a maximum speed of about 450 km. per hour, whereas the aircraft according to the invention will have a maximum speed of the order of 550 km. per hour.

In all cases, the presence of the rotating wing system permits the dimensions of the fixed wings to be reduced.

It should be observed that the source of power which generally delivers compressed-air for driving the rotor, could also be located outside the machine, either on the ground or on another aircraft which follows it or which tows it by a cable. In this way, there is obtained a new type of piloted or remote-controlled glider.

The machine according to the invention in its various forms, may of course combine its technical features with those which are already being studied or produced at the present time, both as regards taking-off and landing and also flight in translation. Finally, the presence of a source of power for driving the rotor, such as a source of compresesd-air which can be employed for other purposes, for example for feeding distribution spraying systems for agriculture, air cushions, etc., constitutes a further advantage of the machine according to the invention.

It will of course be understood that the forms of embodiment described may be given numerous modifications. Thus, it is possible to create a combustion at the extremities of the blades for the extracted portion of air, so as to increase the thrust efficiency at the blade extremity. Similarly, instead of leading the air up to the extremities of the blades, the rotor may be run-up to speed by the discharge of compressed-air from arms carried for that purpose by the rotor.

Finally, the rotor could be driven mechanically with a possibility of de-clutching during flight, the necessary back-torque being then obtained for example by means of an orientatable flap mounted in the jet of the reactor.

What I claim is:
1. In an aircraft of the type including a fixed wing, propulsion means, a source of energy, a rotor having at least two blades, and means coupling said source of energy with the rotor so as to effect rotation of the blades of the rotor from said source, wherein the improvement comprises a rotor having a diameter sufficient for the aircraft to take off substantially vertically said rotor rotating at approximately 15 percent above normal rotor speed, said rotor diameter being substantially less than the diameter necessary to permit the aircraft to carry out hovering or lateral flights at normal rotor speeds, each of said blades having the major portion of its mass concentrated in the outer half of the length of said blade, and said blades having a rigidity and strength allowing a rotation overspeed of at least 15% with respect to the maximal rotation speed during forward flights.

2. An aircraft according to claim 1, wherein said rotor has a diameter at least 25% less than the diameter which is necessary to permit the aircraft to carry out hovering or lateral flights at normal rotor speeds.

3. An aircraft according to claim 1, wherein each rotor blade has a cross-sectional area less than that necessary in conjunction with a given diameter of the rotor to permit the aircraft to carry out hovering or lateral flights at normal rotor speeds.

4. An aircraft according to claim 3, wherein the reduced cross-sectional area of the blades is achieved by a reduction of the chord of each blade.

5. An aircraft according to claim 3, wherein the reduced cross-sectional area of the blades is achieved by a reduction of the thickness of each blade.

6. An aircraft according to claim 3, wherein the reduced cross-sectional area is achieved both by a reduction of the chord of each blade and by a reduction of the thickness of each blade.

References Cited

UNITED STATES PATENTS

| | | | |
|---|---|---|---|
| 2,644,536 | 7/1953 | Kelley | 170—159 |
| 2,653,778 | 9/1953 | Bennett et al. | 244—6 |
| 2,754,917 | 7/1956 | Kee | 170—159 |
| 1,877,902 | 9/1932 | Kuethe | 244—6 |

FOREIGN PATENTS 586,527   11/1959   Canada.

FERGUS S. MIDDLETON, Primary Examiner

T. W. BUCKMAN, Assistant Examiner

U.S. Cl. X.R.

170—159; 244—17.11